3,321,088
FILTER CARTRIDGE
Victor A. Williamitis, Dayton, Ohio, assignor to General Motors Corporation, Detroit, Mich., a corporation of Delaware
Continuation of application Ser. No. 273,117, Apr. 15, 1963. This application May 16, 1966, Ser. No. 550,565
1 Claim. (Cl. 210—489)

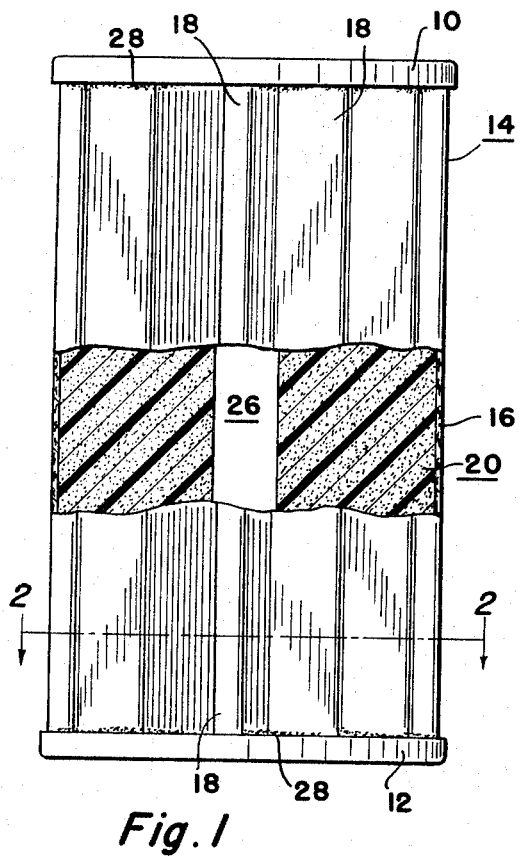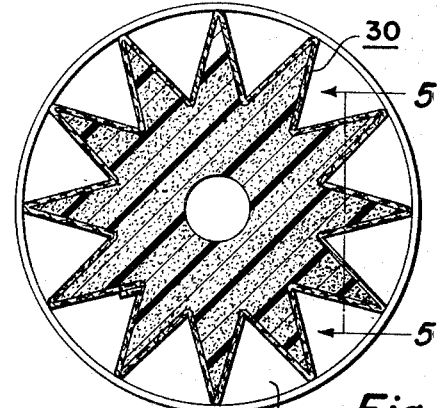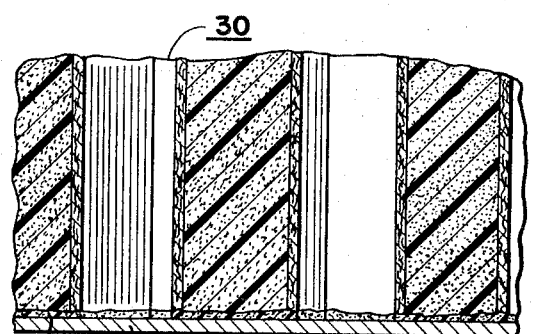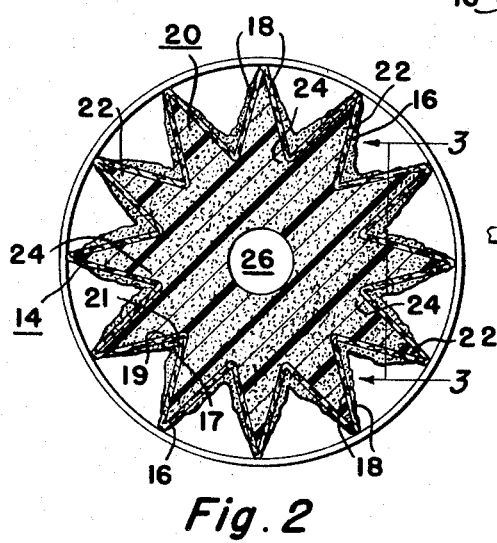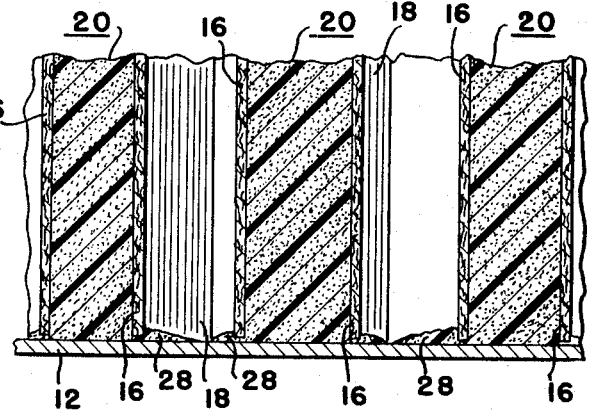

This application is a continuation of applicant's copending application Ser. No. 273,117, filed Apr. 15, 1963, now abandoned.

This invention relates to filters and more particularly to improved disposable filter cartridges for treating fluids such as oils, dry cleaning solvents and the like and improved methods for manufacturing such filters.

Many disposable filter cartridge arrangements have a thin sheet of filter medium that serves as a primary means for filtering fluid passing through the cartridge. One problem with such cartridge arrangements is that relatively expensive components are required to reinforce the thin sheet of filter medium against pressure differentials imposed thereacross during use. Furthermore, the known methods for assembling filter cartridges having such a thin sheet filter involve many expensive steps.

An object of the present invention, therefore, is to reduce the cost of filter cartridges having a thin sheet of filter material as the primary filtering component.

A further object of the invention is to improve filter cartridges by including improved means therein for providing a full surface support for a thin sheet filter medium component thereof.

A still further object of the invention is to provide a filter cartridge having an inner core of open-cell polymeric material serving as the sole means for fully supporting the surface of a thin sheet filter medium component wherein the polymeric material is adapted to include additives for conditioning fluid passing through the filter cartridge.

Further objects and advantages of the present invention will be apparent from the following description, reference being had to the accompanying drawings wherein preferred embodiments of the present invention are clearly shown.

In the drawings:

FIGURE 1 is a view in side elevation, partially in section, of one embodiment of the invention;

FIGURE 2 is a view in horizontal section taken along the line 2—2 of FIGURE 1;

FIGURE 3 is an enlarged, fragmentary vertical sectional view taken along the line 3—3 of FIGURE 2;

FIGURE 4 is a view in horizontal section of another embodiment of the invention; and FIGURE 5 is a view in vertical section taken along the line 5—5 of FIGURE 4.

Referring now to FIGURES 1, 2 and 3 of the drawing, one embodiment of the invention is illustrated as comprising two centrally apertured end plates 10, 12 on either end of a hollow cylindrical filtering unit 14 representatively illustrated as having its outer peripheral surface formed by a thin layer 16 of a filter medium such as plain filter paper. The thin layer 16 is representatively illustrated as having a large number of accordion pleats 18 directed longitudinally thereof to provide a relatively large effective filtering area in a compact space. The layer 16 further includes side edges 17, 19 fastened together by suitable means, for example, an adhesive at 21 in FIGURE 2.

In accordance with certain of the principles of the present invention, the maximum effective filtering area of the thin layer 16 of filter paper is maintained by means of an improved support structure that prevents any of the pleats 18 from collapsing on itself or folding against an adjacent pleat. Furthermore, the improved support structure acts to reinforce the thin layer 16 against pressure differentials imposed thereacross during use that might otherwise rupture the filtering surface of the layer 16. More particularly, the invention contemplates the use of a support structure located completely interiorly of the thin layer 16 of filter medium thereby eliminating O.D. perforated support covers, O.D. locating-spacing bands, ribbons, cords and the like previously used in filter cartridges having such a thin layer of filter medium as their primary filtering component. Furthermore, the support structure of the present invention eliminates the need for stiffening and strengthening plain filter paper by means of resin impregnation of other strengthening admixtures previously used in the filter cartridge field to strengthen plain filter papers sufficiently to prevent the rupture thereof.

Thus, in the embodiment of FIGURES 1 through 3 a core 20 of rigid material is located interiorly of the thin layer 16 of filter paper. The core 20 has a plurality of ridges 22 and valleys 24 formed in the outer surface thereof corresponding to the pleats 18 in the thin layer 16 of filter paper with the outer surface of the core 20 thereby filling the interior spaces formed by the pleats 18 so that the outer surface of the core 20 is in juxtaposition with the inner surface of the thin layer 16 whereby a full rigid surface support is present throughout the filtering surface defined by the thin layer 16 of filter paper. The core 20 thereby serves to space the pleats 18 and to prevent any collapsing of the pleats that might otherwise tend to reduce the maximum effective filtering area of the thin layer 16 and the full rigid surface support produced by the core 20 prevents the pressure differential imposed across the thin layer 16 from rupturing the filtering surface defined thereby.

In accordance with other of the concepts of the present invention the core 20 is formed of an open-cell polymeric foam material that is characterized by its light weight and a large number of relatively open passageways therethrough as defined by the open-cell structure thereof. The core 20 preferably includes an opening 26 directed centrally therethrough, for collecting fluid that has filtered through the thin layer 16 and has passed through the open-cell passageways in the core 20.

The above-described filter cartridge is typically interposed between a source of unfiltered fluid communicating with the outer surface of the thin layer 16 of filter paper 20 and a receiver for filtered material. The unfiltered fluid typically passes through the thin layer 16 of filter paper and thence across the core 20 of open cell rigid foam to collect in the opening 26 from whence it passes into the receiver for filtered material. The core 20 is primarily intended to serve as an improved means for supporting the thin layer 16 of filter material and for spacing pleats therein and the fluid passageways formed by the open-cell structure thereof are relatively open as compared to the passageways through the thin layer 16 of filter material and hence the layer 16 acts as the primary filtering component of the filter cartridge and the life of the cartridge will therefore be determined by the filtering characteristics of the thin layer 16.

Another aspect of the invention is that the core 20 of open-cell polymeric material can be modified by adding suitable agents thereto for treating or conditioning fluid passing therethrough. For example, in cases where the filter cartridge is used for treating dry cleaning solvents, carbon can be added to the core 20 for removing dye coloring from the solvent as it passes thereacross.

The end caps 10, 12 cooperate with a filter cartridge enclosure to prevent by-passing of unfiltered fluid into the interior of the filter cartridge before passing across the thin layers 16 of filter material and in the embodiment of FIGURES 1 through 3, a portion of the foam material of the core 20 may be passed through the interface between the thin layer 16 of filter paper and the supporting surface of the end plates 10, 12 as illustrated at 28 in FIGURES 1 through 3 to adhere the thin layer 16 of filter paper to the end caps 10, 12. The thickness of the layer of foam at 28 adhering the thin layer 16 of paper to the end caps 10, 12 is very thin so that there will be no tendency for any appreciable amount of unfiltered fluid to by-pass the liner 16 of filter paper at the interface between the liner 16 and the end caps 10, 12.

The embodiment of the invention illustrated in FIGURES 4 and 5 is identical to the embodiment of FIGURES 1 through 3 except that the filter cartridge of this embodiment has a hollow cylindrical filtering unit 30 that is connected to end caps such as that illustrated at 32 by means of a layer of a suitable adhesive 34 located at the interface between the cylindrical filtering unit 30 and the end plate 32.

While the embodiment of the present invention as herein disclosed constitutes a preferred form, it is to be understood that other forms might be adopted.

What is claimed is as follows:

A filter cartridge unit comprising, a hollow open-ended cylindrical filter paper element having a plurality of accordion pleats directed longitudinally thereof for increasing the effective filtering surface area of said cylindrical element, a reinforcing core of rigid open cell plastic foam material located interiorly of said cylindrical filter paper element having radially outwardly directed ridges on the outer surface thereof, each of said ridges having side surfaces located in juxtaposition with one of the pleats in said cylindrical filter paper element for supporting said filter paper against the passage of fluid thereacross and for spacing and supporting each of said pleats against collapsing on itself or an adjacent pleat, said ridges constituting the sole support for preventing collapse of said pleats, said paper element being the outermost portion of the filter cartridge unit exposed to unfiltered fluid directed thereacross and serving to remove most of the suspended particulate matter in the fluid stream prior to its passage through said open cell reinforcing element whereby said paper element determines the life of the cartridge unit, an end plate covering one open end of said cylindrical filter paper element and having a surface thereon bonded by said core directly to said core, a portion of said core being directed against the end of said cylindrical filter paper element for bondingly securing the end of said cylindrical element to said end plate.

References Cited by the Examiner

UNITED STATES PATENTS

| | | | |
|---|---|---|---|
| 2,016,993 | 10/1935 | Dollinger | 210—493 X |
| 2,726,184 | 12/1955 | Cox et al. | 210—493 X |
| 2,770,241 | 11/1956 | Winkler | 210—496 X |
| 2,801,648 | 8/1957 | Anderson et al. | 260—75 X |
| 2,961,710 | 11/1960 | Stark | 210—496 X |
| 2,966,960 | 1/1961 | Rochlin | 55—502 |
| 2,973,295 | 2/1961 | Rodgers | 156—79 |

FOREIGN PATENTS

| | | |
|---|---|---|
| 754,834 | 8/1956 | Great Britain. |
| 892,663 | 3/1962 | Great Britain. |

REUBEN FRIEDMAN, *Primary Examiner.*

SAMIH N. ZAHARNA, C. DITLOW,
*Assistant Examiners.*